United States Patent
Kanatzidis

(10) Patent No.: US 7,407,696 B2
(45) Date of Patent: Aug. 5, 2008

(54) PHASE CHANGE MATERIALS FOR STORAGE MEDIA

(75) Inventor: Mercouri G. Kanatzidis, Okemos, MI (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 564 days.

(21) Appl. No.: 10/543,214

(22) PCT Filed: Jan. 22, 2004

(86) PCT No.: PCT/US2004/001732

§ 371 (c)(1),
(2), (4) Date: Jul. 22, 2005

(87) PCT Pub. No.: WO2004/067624

PCT Pub. Date: Aug. 12, 2004

(65) Prior Publication Data

US 2006/0072442 A1    Apr. 6, 2006

Related U.S. Application Data

(60) Provisional application No. 60/442,210, filed on Jan. 24, 2003.

(51) Int. Cl.
*B32B 3/02* (2006.01)

(52) U.S. Cl. .................. 428/64.1; 428/64.4; 428/64.5; 430/270.13

(58) Field of Classification Search ............... 428/64.1, 428/64.4, 64.5; 430/270.13
See application file for complete search history.

(56) References Cited

U.S. PATENT DOCUMENTS

| | | | | |
|---|---|---|---|---|
| 5,169,745 A | * | 12/1992 | Yashiro et al. | 430/270.13 |
| 5,234,803 A | * | 8/1993 | Raychaudhuri | 430/270.13 |
| 5,238,722 A | | 8/1993 | Yashiro et al. | |
| 5,641,606 A | * | 6/1997 | Suzuki et al. | 430/270.13 |
| 6,866,910 B2 | * | 3/2005 | Kamezaki et al. | 428/64.1 |

FOREIGN PATENT DOCUMENTS

JP    62256692 A  * 11/1987

* cited by examiner

*Primary Examiner*—Elizabeth Mulvaney
(74) *Attorney, Agent, or Firm*—Harness, Dickey & Pierce, P.L.C.

(57) ABSTRACT

Phase-change compounds, and optical storage recording media, for recording and/or storage of data, comprising such compounds, according to the formula $XSb_yS_z$; wherein X is selected from the group consisting of K, Rb, Tl, Na, Li, Cs and mixtures thereof; and wherein y is about 1 or about 5, and z is about 1 or about B. Preferably, X is K, y is 5 and z is B. Also provided are optical recording media comprising a layer of the phase-change material and methods of creating a reversible phasechange by irradiating the material with a laser radiation.

16 Claims, 4 Drawing Sheets

RECORDING AND REPRODUCING LIGHT

RECORDING AND REPRODUCING LIGHT

RECORDING AND REPRODUCING LIGHT

RECORDING AND REPRODUCING LIGHT

1

PHASE CHANGE MATERIALS FOR STORAGE MEDIA

CROSS-REFERENCE TO RELATED APPLICATION

This application claims benefits of Provisional Application 60/442,210, filed Jan. 24, 2003.

GOVERNMENT RIGHTS

This invention was made with Government support under Contract No. DMR-0127644 awarded by the National Science Foundation. The U.S. Government has certain rights in this invention.

FIELD OF INVENTION

The invention disclosed relates generally to materials that undergo rapid, reversible crystal-glass-crystal optical phase-change. Such materials are useful, for example, in data storage media and more specifically in optical recording media having a recording layer comprising optical phase-change memory materials.

BACKGROUND OF THE INVENTION

Optical disks record and reproduce signals by altering the reflection properties of a substrate on a recording-film. Generally, a signal is recorded as minute spots on a substrate having optical spot diameters which are on the order of the light wavelength used during reproduction or play-back. Such media are used to produce optical disks such as compact disks (CDs) and a laser video disks (LVDs or DVDs). There are a variety of materials and methods used for such recording media, resulting in media that are read-only, media that are record once/read only, and media that may repeatedly be recorded, read and erased.

In a read only type optical disk, a signal track is recorded as a series of small concave and convex pits between a transparent disk substrate such as resin or the like and a reflective film comprising aluminum or similar materials. During signal reproduction, a scanning operation is effected on the signal track by focusing a laser beam on the series of pits. The laser beam is reflected at locations where pits do not exist and is substantially diffracted at locations where pits exist. By using an optical detector, the location of the signal pits can be discriminated in accordance with a magnitude of the reflected light, and interpreted as a digital signal of ones and zeros.

Media that can be recorded during use employ materials whose optical properties are switchable between at least two detectable states by the application of optical energy during the recording process. The state of the phase-change material is detectable by properties such as, for example, index of refraction, optical absorption, optical reflectivity, or combinations thereof. The media is usually comprised of a transparent substrate, an undercoat, an active layer and an overcoat. The active is a chalcogenide phase change material that has a crystalline state and an amorphous state, or that has two crystal states. Initially, the active layer is in the crystalline state. In the former case, the amorphous state is formed by heating a portion or spot of the active layer with a high power laser pulse of short duration to a temperature above its melting point to change it to a liquid state. If the spot cools sufficiently rapidly it changes to the amorphous state. In erasable media, capable of multiple recording cycles, the amorphous material returns to its crystalline state when the amorphous spot is heated again, with a lower powered laser. To read the media, a very low power laser is reflected off of the active layer. The crystalline state has a higher or different reflectivity than the amorphous state and this difference in reflectivity is detected and interpreted as data ones and zeros.

As a recording film material, phase change materials known in the art include those comprising Te, In, Sb, Se or the like as principal components. For example, the thin films containing $Te_{85}Ge_{15}$, $Te_{87}Ge_8Sn_5$, $Te_{92}Ge_2As_5$, and $Te_{81}Ge_{15}S_2Sb_2$ are known to produce reversible phase-transitions. Such materials are discussed in the following references: U.S. Pat. No. 3,530,441 Ovsinsky, issued Sep. 22, 1970; A. W. Smith, *Applied Physics Letters*, 18 (1971) p. 254; and M. Chen et al., *Applied Physics Letters*, 46 (1985) p. 734.

Optical recording discs have been standardized internationally to be a diameter of 120 mm; therefore the only way to increase storage capacity is to increase the density of data storage on the standardized disc. Increased data storage density requires, in turn, smaller individual optical spot diameters. A limitation in this regard is the frequency of light used to form and resolve the individual spots—smaller spots require the use of shorter wavelength (higher frequency) light. The current art responds well to laser pulses in the near-infrared (>1000 nm wavelength) range. What is needed is a material highly responsive in the UV-Vis region greatly increasing the potential capacity of a corresponding storage medium.

SUMMARY OF THE INVENTION

The present invention provides phase-change compounds, and optical storage recording media, for recording and/or storage of data, comprising such compounds, according to the formula $XSb_yS_z$; wherein X is selected from the group consisting of K, Rb, Tl, Na, Li, Cs and mixtures thereof; and wherein y is about 1 or about 5, and z is about 1 or about 8. Preferably, X is K, y is 5 and z is 8. Also provided are optical recording media comprising a layer of the phase-change material and methods of creating a reversible phase-change by irradiating the material with a laser radiation.

The present invention also provides methods of making a phase-change compound of the formula $XSb_yS_z$; wherein X is selected from the group consisting of K, Rb, Tl, Na, Li, Cs and mixtures thereof; and wherein y is about 1 or about 5, and z is about 1 or about 8; comprising:

(a) placing stoichiometric amounts of metallic X, Sb and S in a reaction vessel;

(b) heating the metals under vacuum so as to melt the metals; and (c) cooling the metals to form the phase-change compound.

Preferably, the cooled phase-change compound is re-melted and quenched in air.

It has been found that the compounds of this invention afford benefits over materials among those known in the art, including one or more of the ability to undergo reversible crystal-glass and glass-crystal transitions using laser light of a wavelength less than about 0.6 μm, and stability in air and moisture, an optical absorption edge that shifts in energy concomitant with the phase transition, a suitable melting point that is not too high so that the materials may be melted with an available laser power but not too low for self-crystallization to occur, a rapid and stable phase-transition process, and, a lack of large compositional deviations. Other benefits will be appreciated by one of ordinary skill in the art.

BRIEF DESCRIPTION OF THE DRAWINGS

The present invention will become more fully understood from the detailed description and the accompanying drawings.

It should be noted that the plots set forth in these figures are intended to show the general characteristics of materials among those of this invention, for the purpose of the description of such embodiments herein. These plots may not precisely reflect the characteristics of any given embodiment, and are not necessarily intended to define or limit specific embodiments within the scope of this invention.

DETAILED DESCRIPTION

The following description of embodiment(s) is merely exemplary in nature and is in no way intended to limit the invention, its application, or uses.

The present invention provides compounds (herein "phase-change compounds") and compositions comprising Sb (antimony) and S (sulfur). In particular, the present invention provides compounds according to the formula $XSb_yS_z$. X is a Group 1 or equivalent element preferably selected from the group consisting of K (potassium), Rb (rubidium), Tl (thallium), Na (sodium), Li (lithium), Cs (Cesium) and mixtures thereof. A particularly preferred Group 1 element is K. (As used herein, "Group" refers to the Group numbers (i.e., columns) of the Periodic Table as defined in the current IUPAC Periodic Table. Also used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.)

The value of y is about 1 or about 5, and z is about 2 or about 8. In one embodiment, y is about 1 and z is about 2. Preferably in such embodiments, X is Na, K, Li, Cs or mixtures thereof. In an another embodiment, y is about 5 and z is about 8. Preferably in such embodiments, X is K, Rb, Tl, Na, Cs and mixtures thereof. Preferred phase-change compounds include those selected from the group consisting of $KSb_5S_8$, $RbSb_5S_8$, $TlSb_5S_8$, $NaSb_5S_8$, $KSbS_2$, $NaSbS_2$, $LiSbS_2$, and mixtures thereof. A preferred phase-change compound is $KSb_5S_8$.

Figure 2A:
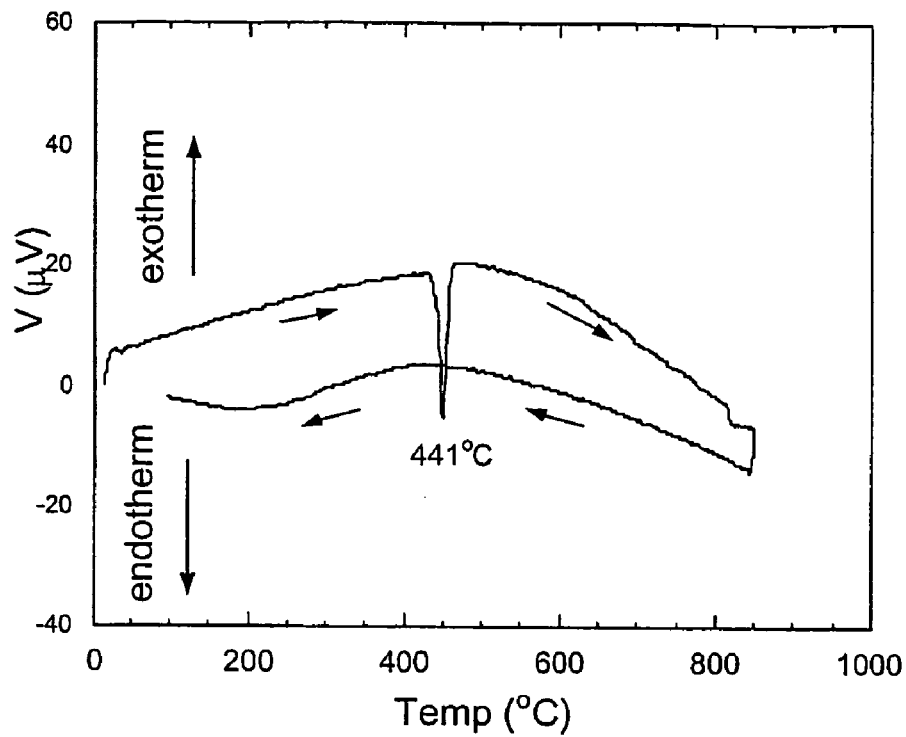
FIGS. 2a and 2b are Differential Thermal Analysis (DTA) graphs of crystalline $KSb_5S_8$: (a) first cycle, (b) second cycle, heating rate 10 K/min.
Figure 2B:
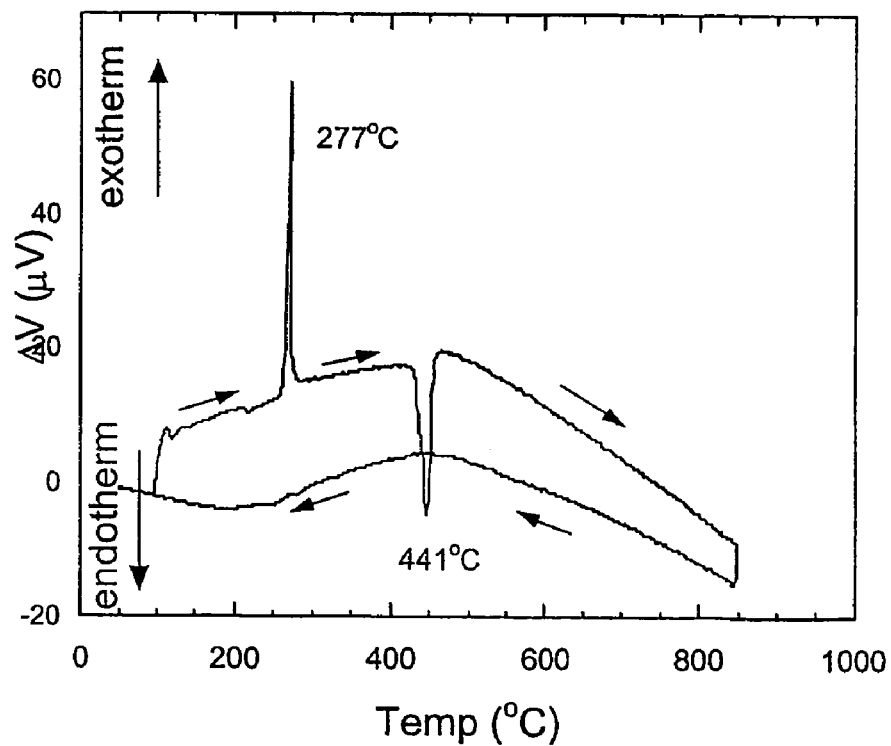
Figure 3:
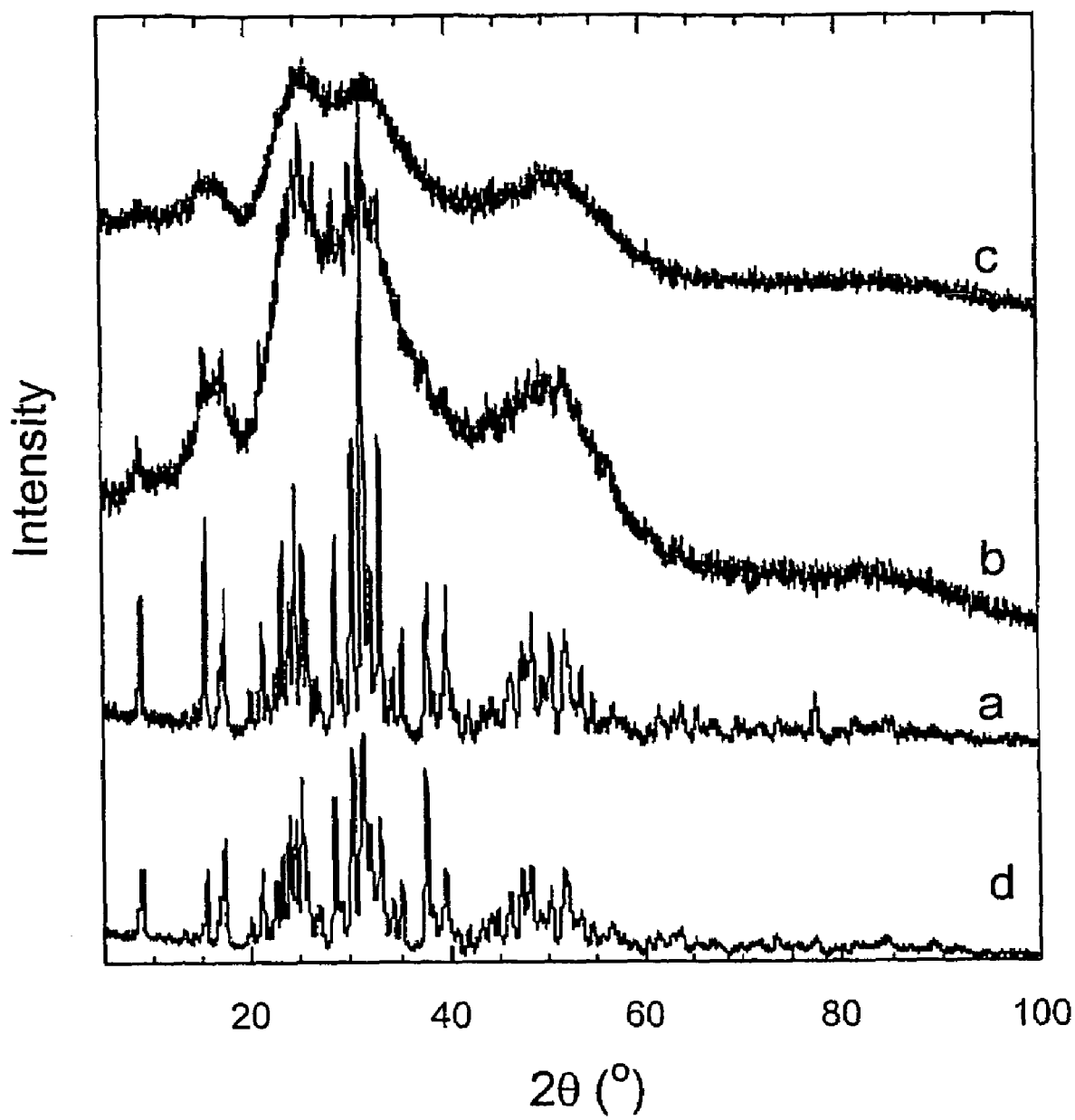
FIG. 3 depicts powder X-ray Diffraction (XRD) patterns of (a) crystalline $KSb_5S_8$, (b) a sample after DTA with cooling rate 10 K/min, (c) a quenched $KSb_5S_8$ in air, and (d) a sample after crystallization peak.
Figure 4:
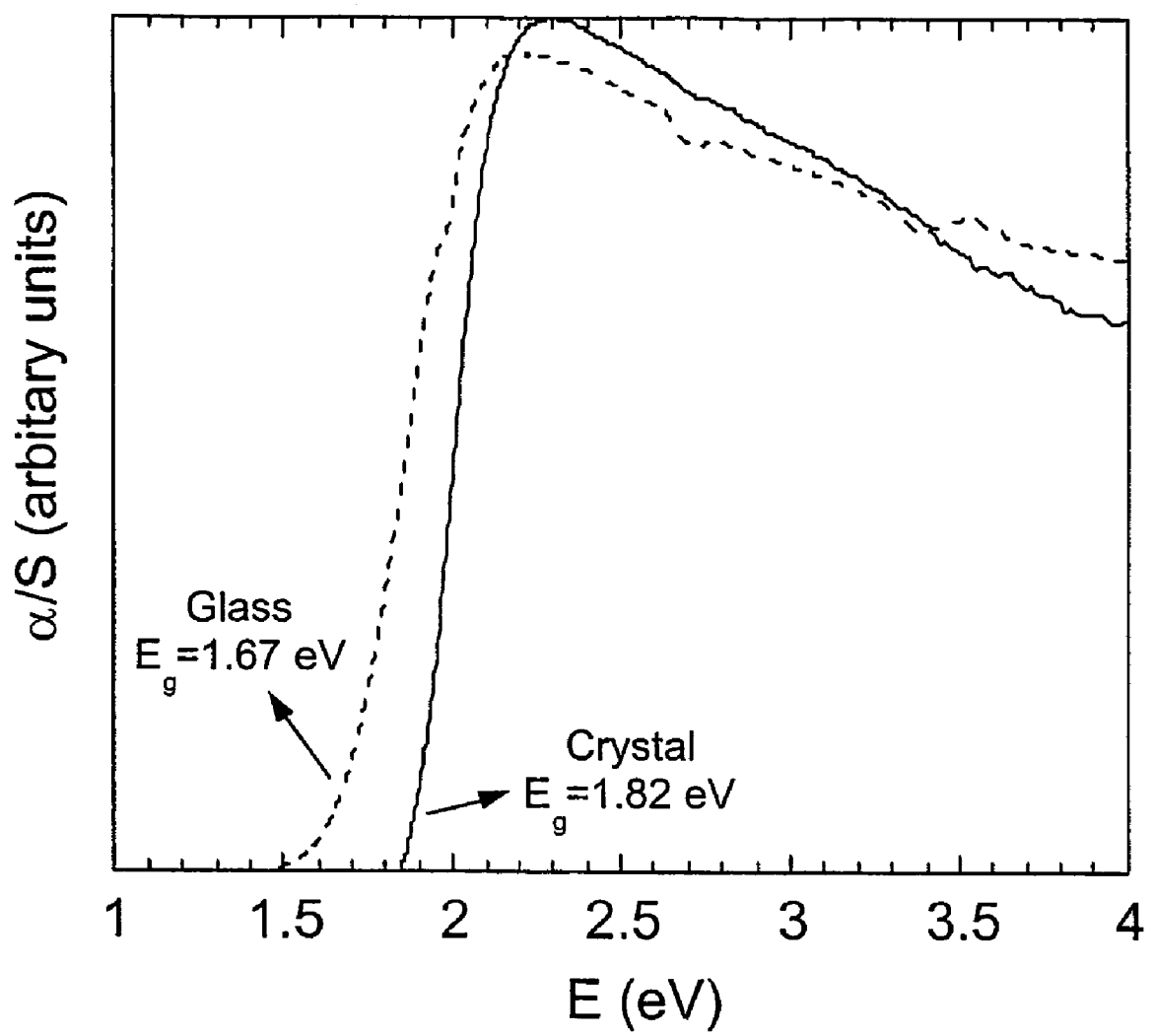
FIG. 4 is the electronic absorption spectra of crystalline and glassy $KSb_5S_8$.

In a preferred embodiment, the phase-change compound is of the formula $KSb_5S_8$, having both covalent character, due to a tight anionic $[Sb_5S_8]^-$ framework, as well as ionic character due to the presence and interactions of $K^+$ ions. $KSb_5S_8$ forms as a pure crystalline phase by reacting a stoichiometric combination of potassium metal, antimony and sulfur at 850° C. In one embodiment, the crystal structure of the $KSb_5S_8$ is an infinitely extended framework of distorted $SbS_6$ octahedra with K atoms found in cavities of this framework. Differential thermal analysis of the crystals during heating up to 850° C., shows one melting endothermic peak at 441° C. but absence of corresponding crystallization peak during cooling, as seen in FIG. 2a. Powder X-ray diffraction after this cycle shows that the sample is amorphous, containing only trace amounts of crystalline phase, as seen in FIG. 3. In a second cycle, a strong and sharp exothermic peak is observed at 277° C. during heating, which is attributed to a glass→crystal transformation, to be followed again by melting at 441° C., as seen in FIG. 2b. The X-ray diffraction pattern of the sample obtained after the crystallization peak at 277° C. is substantially identical to that of the pure pristine material, as seen in FIG. 3. The $KSb_5S_8$ material becomes a metastable glass upon melt cooling which then quantitatively reverts back to the crystalline form at 277° C., as seen at plot (c) in FIG. 3. Both the crystalline and glassy forms are dark red in color. Crystalline $KSb_5S_8$ is a semiconductor with a band gap of 1.82 eV or 681 nm, while the glass shows lower but equally well-defined band gap of 1.67 eV or 743 nm, as seen in FIG. 4, with an 0.15 eV narrowing of the optical band gap.

Methods of Manufacture:

The present invention also provides methods of making a phase-change compound of the formula $XSb_yS_z$; wherein X is selected from the group consisting of K, Rb, Tl, Na, Li, Cs and mixtures thereof; and wherein y is about 5 and z is about 8, or wherein y is about 1 and z is about 2; comprising:
(a) placing stoichiometric amounts of metallic X, Sb and S in a reaction vessel;
(b) heating the metals under vacuum so as to melt the metals; and
(c) cooling the metals to form the phase-change compound.

Preferably, the cooled phase-change compound is re-melted and quenched in air.

Applications:

In a preferred embodiment, the present invention provides a storage medium comprising a layer of a phase-change compound, for use in data handling or storage applications. No particular limitation is imposed on the structure of the phase-change type storage medium of the present invention. Media may comprise substantially planar configurations, such as disks, or other three dimensional configurations. In a preferred embodiment, the medium comprises a thin film of the phase change material. Preferably, the film is supported on or in a substrate. Media comprising such substrates include media among known in the art.

Figure 1A:
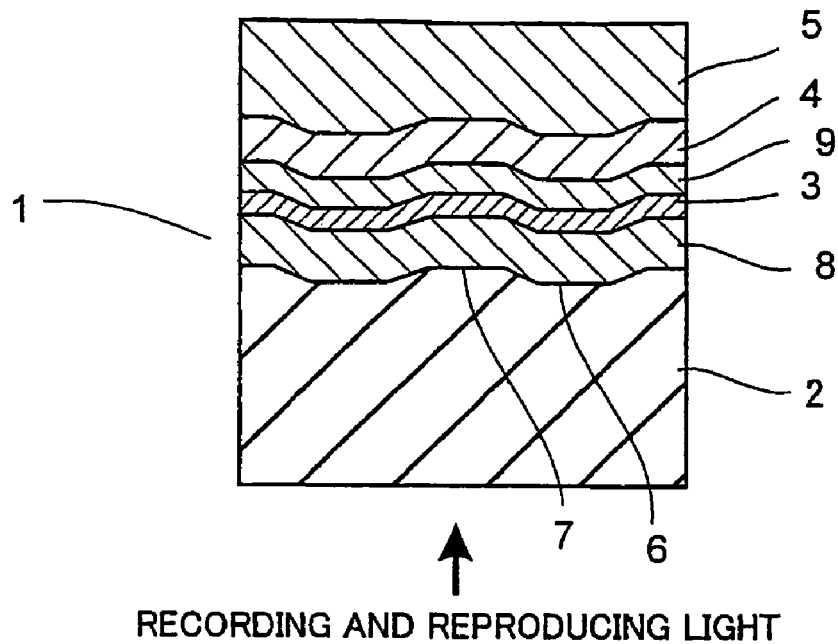
FIGS. 1a and 1b are sectional schematics illustrative of two embodiments of optical recording media according to the present invention.
Figure 1B:
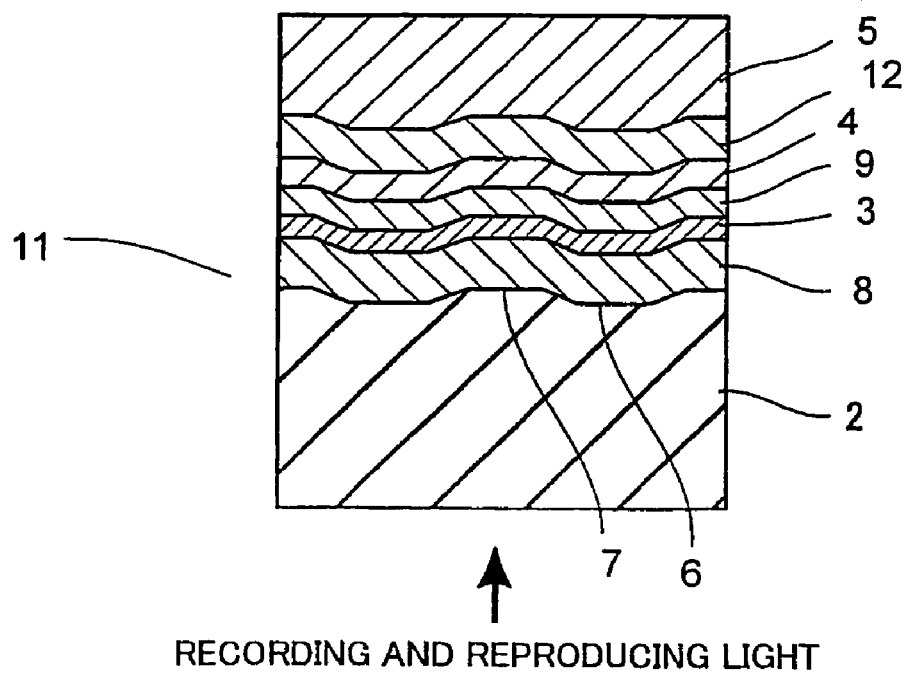

In one embodiment, the present invention provides a recording medium which comprises at least a substrate, a phase-change type recording layer comprising a phase change material provided on the substrate, and a dielectric layer provided in contact with the side of the recording layer on which reading light is incident. As depicted in FIGS. 1a and 1b, embodiments of the present invention comprise recording media (1) and (11), wherein a first dielectric layer (8), a recording layer (3) comprising a phase change compound, and a second dielectric layer (9) are formed on a substrate (2), with a reflective layer (4) on the second dielectric layer (9), as shown in FIG. 1a, or with a third dielectric layer (12) and a reflective layer (4), as shown in FIG. 1b. An asperity pattern of grooves (6) and lands (7) may be formed in the substrate. In such embodiments, the medium shown in FIG. 1a is called a reflection type medium and the medium shown in FIG. 1b is referred to as an absorption coefficient control type medium.

In further embodiments, double side recording type media comprising two such single side recording type media that are bonded together at protective layers (5) through adhesive layers. Furthermore, in other embodiments of the present invention one side recording type medium is bonded to a protective substrate through an adhesive layer.

In a further embodiment, it is necessary to add a quenching layer to the recording film, in order to write the media from crystalline state to the amorphous state. This causes the film to cool very rapidly from the molten state into the amorphous condition when the laser pulse ends. In many disks a thin insulating layer is formed between the recording layer and the quenching layer. This allows the drive to heat the recording layer to the melting point with an acceptable laser power.

Structures, methods, manufacture and use among those useful herein are disclosed in the following references, all of which are incorporated by reference herein: U.S. Pat. No. 6,403,193, Shingai, issued Jun. 11, 2002; U.S. Pat. No. 6,288,997, Nakamura, issued Sep. 11, 2001; U.S. Pat. No. 6,011,757, Ovshinsky, issued Jan. 4, 2000; U.S. Pat. No. 5,959,961, Matsui, issued Sep. 28, 1999; U.S. Pat. No. 6,022,605, Kaneko, issued Feb. 8, 2000; U.S. Pat. No. 5,202,881, Suzuki, issued Apr. 13, 1993; U.S. Pat. No. 4,216,501, Bell, issued Aug. 5, 1980; U.S. Pat. No. 4,576,895, Barton, issued Mar. 18, 1986; U.S. Pat. No. 4,635,245, Smith, issued Jan. 6, 1987; U.S. Pat. No. 4,644,519, Markvoort, issued Feb. 7, 1987; U.S. Pat. No. 4,660,175, Strand, issued Apr. 21, 1987; U.S. Pat. No. 4,709,363, Dirks, issued Nov. 24, 1987; U.S. Pat. No. 4,719,594, Young, issued Jan. 12, 1988; U.S. Pat. No. 4,787,077, Barton, issued Nov. 22, 1988; U.S. Pat. No. 4,839,883, Nagata, issued Jun. 13, 1989; and U.S. Pat. No. 3,530,441, Ovsinsky, issued Sep. 22, 1970.

The phase-change material is preferably incorporated in an optical recording medium having a structure such that the optical phase-change memory material is supported by a substrate and protected by encapsulants. In the case of optical recording media, the encapsulants include, for example, anti-ablation materials and layers, thermal insulation materials and layers, anti-reflection materials and layers, reflective layers, and chemical isolation layers. In some embodiments, the various layers perform more than one of these functions. For example, anti-reflection layers may also be anti-ablation layers and thermal insulating layers. The thicknesses of the layers, including the layer or layers of optical phase-change memory material, are engineered to minimize the energy necessary for effecting the state change as well as to optimize the high contrast ratio, high carrier-to-noise ratio and high stability of the optical phase-change memory materials. Generally, a laser is used to supply the optical energy to cause the phase transitions between amorphous and crystalline states in an optical phase-change memory material. The amount of energy applied to the memory material is a function of both the power of the laser as well as the period of time that the laser pulse is applied. The crystallization energy is defined herein as the amount of energy per unit volume needed to substantially re-crystallize an amorphous region of the memory material. The crystallization energy is dependent upon many factors, including the energy necessary for nucleation during the crystallization process.

$KSb_5S_8$ is a well defined, congruently melting stoichiometric system that undergoes reversible crystal→glass→crystal transformation. In one embodiment, the activation energy of crystallization $E_c$ is ~167±3.1 kJ/mol, as determined using the Kissinger and Flynn-Wall-Ozawa equations. The kinetic parameters and energy band gaps determined for $KSb_5S_8$ allow its use in high density optical data storage applications using lasers with considerably shorter wavelengths than currently employed or even other mechanisms. In one embodiment, the irradiation, preferably laser light, used to record and read data using a medium of this invention has a wavelength less than about 800 nm. In one embodiment, a laser is used having a wavelength of from about 676 nm to about 686 nm, preferably about 681 nm. In another embodiment, a laser issued having a wavelength of from about 738 nm to about 748 nm, preferably about 743 nm.

The compounds, compositions and methods of this invention are exemplified in the following non-limiting example.

EXAMPLE $KSb_5S_8$ is formed as a crystalline ingot by reacting a stoichiometric combination of potassium metal, antimony and sulfur. A mixture of 0.130 g K (3.32 mmol), 2.0193 g Sb (16.59 mmol) and 0.8510 g S (26.54 mmol) is loaded in a silica tube and sealed under vacuum ($10^{-4}$ Torr). The mixture is heated at 850° C., kept there for about 1 hour and cooled to room temperature at a rate of ~15° C./hour. Glassy $KSb_5S_8$ is formed after re-melting the $KSb_5S_8$ crystals and quenching in air.

Differential Thermal Analysis (DTA):

Differential Thermal Analysis (DTA) was performed with a computer-controlled Shimadzu DTA-50 thermal analyzer. The ground single crystals (~30 mg total mass) were sealed in silica ampoules under vacuum. A silica ampoule containing alumina powder of equal mass was sealed and placed on the reference side of the detector. The samples were heated to 850° C. at 10° C./min where isothermed for 5 min followed by cooling at 10° C./min to room temperature, resulting in the plots shown in FIGS. 2a and 2b.

Differential Scanning Calorimetric (DSC) Measurements:

Differential scanning calorimetric (DSC) measurements were carried out with a Setaram DSC141 calorimeter. Temperature and energy calibrations of the instrument were performed using the well-known melting temperatures and melting enthalpies of high purity zinc and indium supplied with the instrument. Bulk-shaped specimens weighing about 7 mg were crimped in aluminum crucibles; an empty aluminum crucible was used as reference. A constant flow of nitrogen was maintained in order to provide a constant thermal blanket within the DSC cell, thus eliminating thermal gradients, and ensuring the validity of the applied calibration standard from sample to sample. DSC runs have been taken at five different heating rates, i.e., 10, 15, 20, 25 and 30K/min. The temperature range covered in DSC was from room temperature through their $T_g$ to 650K. The glass transition temperature was considered to be that corresponding to the intersection of the two linear portions adjoining the transition elbow in the DSC trace. Three characteristic temperatures were observed: the glass transition ($T_g$=222.7° C.), the onset temperature of crystallization ($T_o$=281.0° C.) and the peak temperature of crystallization ($T_p$=287.3° C.).

Activation Energy of Glass Transition:

To determine the activation energy of glass transition ($E_g$) is determined using the Kissinger formula (H. E. Kissinger, *J. Res. Nat. Bur. Stand,* 1956, 57, 217), which was originally derived for crystallization processes. The values of the activation energy obtained for the glass transition are 476.0±28.3 kJ/mol and 484.3±28.3 kJ/mol, respectively. These are rather large activation barriers compared to many non-stoichiometric chalcogen-rich glasses and are probably a consequence of the rigid, highly connected and continuous nature of the $[Sb_5S_8]^-$ framework and of the absence of floppy regions and weak van del Waals gaps in the structure.

Activation Energy of Crystallization:

The activation energy of crystallization ($E_c$) was estimated using both the Kissinger's method and Ozawa, Flynn and Wall (OFW) method (T. Ozawa, *J. Thermal Anal.* 1970, 2, 301). The main value of the rate constant for the peak temperature is $2.1 \times 10^{-2}$ s$^{-1}$. By comparison the rate constant for the peak temperature in Ge$_2$Sb$_2$Te$_5$ is $2.45 \times 10^{-2}$ s$^{-1}$ (J. Park, M. Choi, H. Seo, C. Yeon, *Jpn. J. Appl. Phys.* 1999, 38, 4775). The KSb$_5$S$_8$ system undergoes bulk crystallization and that its nucleation rate increases with time.

X-Ray Diffraction:

The samples were examined by X-ray powder diffraction for identification and to assess phase purity. Powder patterns were obtained using a CPS 120 INEL X-ray powder diffractometer with Ni-filtered Cu K$\alpha$ radiation operating at 40 kV and 20 mA and equipped with a position-sensitive detector. The purity of phases for the solid solutions was confirmed by comparison of X-ray powder diffraction pattern to the calculated one from single crystal data for KSb$_5$S$_8$ using the Cerius software, as seen in FIG. 3.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A phase-change storage media comprising a layer of a phase change compound according to the formula XSb$_y$S$_z$; wherein X is selected from the group consisting of K, Rb, Tl, Na, Li, Cs and mixtures thereof; and wherein y is about 5 and z is about 8, or wherein y is about 1 and z is about 2.

2. A phase-change storage media comprising a layer of a phase change compound according to the formula XSb$_y$S$_z$; Wherein X is selected from the group consisting of K, Rb, Tl, Na, Li and mixtures thereof; and wherein y is about 5 and z is about 8, or wherein y is about 1 and z is about 2.

3. A media of claim 2 wherein X is K.

4. An optical recording medium comprising a phase-change compound according to the formula XSb$_y$S$_z$; wherein X is selected from the group consisting of K, Rb, Tl, Na, Li, Cs and mixtures thereof; and wherein y is about 5 and z is about 8, or wherein y is about 1 and z is about 2.

5. A medium according to claim 4 wherein X is selected from the group consisting of K, Rb, Tl, Na, Li and mixtures thereof; and wherein y is about 5 and z is about 8, or wherein y is about 1 and z is about 2.

6. A medium of claim 5 wherein X is K.

7. A method for a creating a reversible phase-change in a phase change compound according to the formula XSb$_y$S$_z$; wherein X is selected from the group consisting of K, Rb, Tl, Na, Li, Cs and mixtures thereof; and wherein y is about 5 and z is about 8, or wherein y is about 1 and z is about 2, comprising irradiating said compound with a distinct wavelength of laser radiation.

8. A method for a creating a reversible phasechange in a phase change compound according to the formula XSb$_y$S$_z$; wherein X is selected from the group consisting of K, Rb, Tl, Na, Li and mixtures thereof; and wherein y is about 5 and z is about 8, or wherein y is about 1 and z is about 2, comprising irradiating said compound with a distinct wavelength of laser radiation.

9. A method of claim 8 wherein the wavelength is from about 676 nm to about 686 nm.

10. A method of claim 9 wherein the wavelength is about 681 nm.

11. A method of claim 8 wherein the wavelength is from about 738 nm to about 748 nm.

12. A method of claim 11 wherein the wavelength is 743 nm.

13. A method for recording data-on an optical recording medium comprising a phase-change compound according to the formula XSb$_y$S$_z$; wherein X is selected from the group consisting of K, Rb, Tl, Na, Li, Cs and mixtures thereof; and wherein y is about 5 and z is about 8, or wherein y is about 1 and z is about 2; said method comprising:
   exposing a discrete region of said medium to irradiation at a level sufficient to effect a phase change in said compound.

14. A method according to claim 13 wherein X is selected from the group consisting of K, Rb, Tl, Na, Li and mixtures thereof; and wherein y is about 5 and z is about 8, or wherein y is about 1 and z is about 2; said method comprising:
   exposing a discrete region of said medium to irradiation at a level sufficient to effect a phase change in said compound.

15. A method for making a phase-change compound according to the formula XSb$_y$S$_z$; wherein X is selected from the group consisting of K, Rb, Tl, Na, Li, Cs and mixtures thereof; and wherein y is about 5, and z is about 8, the method comprising the steps of:
   (a) combining stoichiometric amounts of metallic X, Sb, and S in a reaction vessel;
   (b) heating the metals under vacuum so as to melt the metals; and
   (c) cooling the metals to room temperature.

16. A method according to claim 15 wherein X is selected from the group consisting of K, Rb, Tl, Na, Li and mixtures thereof.

* * * * *

UNITED STATES PATENT AND TRADEMARK OFFICE
CERTIFICATE OF CORRECTION

PATENT NO. : 7,407,696 B2
APPLICATION NO. : 10/543214
DATED : August 5, 2008
INVENTOR(S) : Mercouri G. Kanatzidis Page 1 of 1

It is certified that error appears in the above-identified patent and that said Letters Patent is hereby corrected as shown below:

Column 1, line 29, "recording-film" should be --recording film--.

Column 1, line 34, after "and", delete "a".

Column 1, line 58, after "active", insert --layer--.

Column 3, line 14, "quenchedKSb$_5$S$_8$" should be --quenched KSb$_5$S$_8$--.

Column 3, line 17, "glassyKSb$_5$S$_8$" should be --glassy KSb$_5$S$_8$--.

Column 7, line 6, "2.1.10$^{-2}$" should be --2.1 10$^{-2}$--.

Column 7, line 36, Claim 2, "Wherein" should be --wherein--.

Column 7, line 50, Claim 7, after "for", delete "a".

Column 8, line 6, Claim 8, after "for", delete "a".

Column 8, line 6, Claim 8, "phasechange" should be --phase-change--.

Column 8, line 21, Claim 13, "data-on" should be --data on--.

Signed and Sealed this

Twenty-first Day of April, 2009

JOHN DOLL
*Acting Director of the United States Patent and Trademark Office*